US011493378B2

(12) United States Patent
Perko et al.

(10) Patent No.: US 11,493,378 B2
(45) Date of Patent: Nov. 8, 2022

(54) FUEL LEVEL MEASUREMENT SYSTEM FOR A MACHINE

(71) Applicant: Caterpillar Inc., Peoria, IL (US)

(72) Inventors: Joshua Thomas Perko, Washington, IL (US); Michael Joseph Campagna, Chillicothe, IL (US); Matthew Jordan Engfehr, Dunlap, IL (US); Balasubramanian Ramachandran, Chennai (IN)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 17/028,540

(22) Filed: Sep. 22, 2020

(65) Prior Publication Data

US 2022/0090953 A1   Mar. 24, 2022

(51) Int. Cl.
  *G01F 23/14*   (2006.01)
  *G01K 13/00*   (2021.01)
  (Continued)

(52) U.S. Cl.
  CPC ........ *G01F 23/80* (2022.01); *B60K 15/03006* (2013.01); *B60K 35/00* (2013.01);
  (Continued)

(58) Field of Classification Search
  CPC ............... F02D 19/027; F02D 19/0647; F02D 2200/0602; F02D 2200/0606; F02D 2200/0614; F02D 2200/0625; F02D 2200/60; F02D 2200/602; F02D 41/0027; B60K 15/03006; B60K 15/03013; B60K 15/03019; B60K 15/03026; B60K 2015/03217; B60K 2015/03361;
  (Continued)

(56) References Cited

U.S. PATENT DOCUMENTS 5,379,637 A * 1/1995 Abowd .................. G01F 23/18
                                                73/1.73
5,549,142 A * 8/1996 Beale ........................ F17C 6/00
                                                141/18

(Continued)

FOREIGN PATENT DOCUMENTS

CN   109099310 A   12/2018
CN   110220108 A    9/2019
(Continued)

*Primary Examiner* — John M Zaleskas
(74) *Attorney, Agent, or Firm* — Lee & Hayes, P.C.

(57) ABSTRACT

A fuel level measurement system and method for liquified natural gas (LNG) powered machines is disclosed. An engine control module (ECM) receives fuel line pressure levels at a first time (e.g., a key-off event) and, again, at a second time (e.g., a key-on event). The ECM predicts an expected change in pressure from the key-off event to the key-on event based on various factors. If the change in pressure detected is greater than a threshold level different from the predicted change in pressure, the ECM determines a fill event and resets a current fuel level. The ECM tracks mass flow commands used to provide fuel to the engine to determine the consumption of fuel from the fuel tank and to determine a new current fuel level based on the amount of fuel consumed. The current fuel level is displayed on a fuel gauge.

20 Claims, 7 Drawing Sheets

(51) Int. Cl.
| | |
|---|---|
| *B60K 15/03* | (2006.01) |
| *F02D 41/00* | (2006.01) |
| *B60K 35/00* | (2006.01) |
| *G01F 23/00* | (2022.01) |
| *G01F 23/80* | (2022.01) |
| *F02D 19/02* | (2006.01) |
| *F02M 21/02* | (2006.01) |

(52) U.S. Cl.
CPC ....... *F02D 19/027* (2013.01); *F02D 41/0027* (2013.01); *F02M 21/0221* (2013.01); *G01F 23/14* (2013.01); *G01K 13/00* (2013.01); B60K 2015/03217 (2013.01); B60K 2370/171 (2019.05); F02D 2200/0602 (2013.01); F02D 2200/0606 (2013.01); F02D 2200/0614 (2013.01); F02D 2200/0625 (2013.01); F02D 2200/60 (2013.01)

(58) Field of Classification Search
CPC ........ F17C 2221/033; F17C 2223/0161; F17C 2250/0417; G01F 23/0061; G01F 23/14
See application file for complete search history.

(56) References Cited

U.S. PATENT DOCUMENTS

| | | | |
|---|---|---|---|
| 5,582,218 A | 12/1996 | Beale | |
| 6,230,558 B1 * | 5/2001 | Miwa | B60K 15/04 73/114.39 |
| 6,467,466 B1 * | 10/2002 | Maekawa | F02D 19/025 123/529 |
| 6,666,084 B2 * | 12/2003 | Schelhas | G01F 9/008 73/290 R |
| 8,028,724 B2 | 10/2011 | Lee et al. | |
| 9,064,401 B2 | 6/2015 | Grant et al. | |
| 2002/0157402 A1 * | 10/2002 | Drube | F17C 5/02 62/50.1 |
| 2003/0150417 A1 * | 8/2003 | Miwa | F02N 11/101 123/179.4 |
| 2008/0190117 A1 * | 8/2008 | Lee | F17C 1/00 62/47.1 |
| 2008/0209915 A1 * | 9/2008 | Harper | F17C 3/00 62/45.1 |
| 2009/0056436 A1 * | 3/2009 | Miceli | G01F 9/008 73/290 R |
| 2009/0216400 A1 * | 8/2009 | Larsen | B60K 15/05 701/30.7 |
| 2010/0288367 A1 * | 11/2010 | Pursifull | B60K 15/03006 137/2 |
| 2011/0071777 A1 * | 3/2011 | Duan | G01F 25/0076 702/55 |
| 2011/0196600 A1 * | 8/2011 | Henderson | G01C 21/3697 701/123 |
| 2012/0285238 A1 * | 11/2012 | Liu | B60K 15/03 73/290 R |
| 2013/0238217 A1 * | 9/2013 | Nolan | F02D 19/024 701/102 |
| 2014/0111327 A1 * | 4/2014 | Naidu | F02D 19/021 340/450 |
| 2014/0223992 A1 * | 8/2014 | Harper | G01F 23/26 73/23.31 |
| 2014/0379240 A1 * | 12/2014 | Nolan | F02D 19/024 701/103 |
| 2015/0206359 A1 * | 7/2015 | Ahmad | F02D 19/025 701/34.4 |
| 2016/0054170 A9 * | 2/2016 | Harper | G01F 23/30 73/23.31 |
| 2016/0082832 A1 * | 3/2016 | Dudar | G01M 3/025 206/459.1 |
| 2016/0273472 A1 * | 9/2016 | Ariie | F02D 19/0647 |
| 2017/0328311 A1 * | 11/2017 | Franklin | F16K 31/54 |
| 2017/0356408 A1 * | 12/2017 | Yang | G01L 5/0052 |
| 2018/0118108 A1 * | 5/2018 | Engfehr | F17C 5/00 |
| 2019/0040818 A1 | 2/2019 | Engfehr et al. | |
| 2019/0086032 A1 * | 3/2019 | Handa | F17C 13/025 |
| 2019/0376826 A1 * | 12/2019 | Thomas | B60K 15/03 |
| 2020/0056558 A1 * | 2/2020 | Weber | F02D 41/04 |
| 2020/0248638 A1 * | 8/2020 | Engfehr | F02D 41/0027 |

FOREIGN PATENT DOCUMENTS

| | | | | |
|---|---|---|---|---|
| DE | 102007030992 A1 * | 1/2009 | ........ | G01F 23/0076 |
| JP | 58122433 A * | 7/1983 | ........ | G01F 15/0755 |
| KR | 20030083261 A * | 10/2003 | ........ | G01F 15/0755 |
| WO | WO-2008049890 A1 * | 5/2008 | .......... | F02D 19/027 |

* cited by examiner

FUEL LEVEL MEASUREMENT SYSTEM FOR A MACHINE

TECHNICAL FIELD

The present disclosure relates to fuel systems for a machine. More specifically, the present disclosure relates to measuring fuel levels for machines, such as construction machinery.

BACKGROUND

Machines, such as mining trucks, loaders, dozers, compaction machines, or other construction or mining equipment, are frequently used for building, construction, mining and other activities. For example, mining trucks are often used for hauling mined materials from mining sites. It is desirable to power these types of machines using alternative fuels, such as liquified natural gas (LNG). LNG machines, for example, may benefit from reduced carbon (e.g., carbon dioxide), particulate (e.g., diesel soot), nitrous oxide (e.g., NOx), and/or organic (e.g., volatile organic compounds (VOC)) emissions relative to traditional fuel (e.g., diesel, gasoline, etc.) powered machines. Additionally, LNG powered machines may provide desirable performance attributes, such as relatively high power output, an advantageous torque profile, etc. relative to machines powered with traditional fuels.

While LNG powered machinery may provide various improvements, such as environmental advantages, systems for measuring cryogenic fuels, such as LNG, present new challenges. Since LNG needs to be kept cold and pressurized in the fuel tank of the vehicle, the fuel tank is typically a multi-layered fuel tank that provides a relatively high level of thermal insulation. Thus, fuel level measurement sensors, such as capacitive sensors, may be integrated in to the fuel tank in a manner where it is difficult to troubleshoot and/or repair failures in the fuel level measurement sensors. Additionally, fuel level measurement sensors, when wired to control hardware outside of the fuel tank, provides a thermal route that can lead to thermal leakage (e.g., reduced effective thermal insulation) of the fuel tank. As a result, it is desirable to be able to measure and/or predict the amount of fuel in the fuel tank without having to only rely on fuel level measurement sensors that are integrated into the fuel tank.

One mechanism for measuring an LNG level is described in U.S. Pat. No. 8,028,724 (hereinafter referred to as "the '724 reference"). The '724 reference describes measuring the flow rate of the fuel gas using a flow meter. The measured flow can be used to determine LNG volume. However, the system described in '724 introduces additional sensors and/or meters, such as a flow meter. This can increase cost and complexity of an LNG fuel delivery system. Additionally, introducing additional elements, such as additional sensors in a fuel delivery path, can reduce the robustness and reliability of an LNG delivery system.

Examples of the present disclosure are directed toward overcoming one or more of the deficiencies noted above.

SUMMARY

In an aspect of the present disclosure, a machine, includes an engine, a fuel level gauge, a fuel tank configured to hold fuel, and an engine control module (ECM) configured to identify a first fuel level in the fuel tank and receive a first operator signal associated with operation of the engine. The ECM is further configured to generate, based at least in part on the first operator signal, a first mass flow command indicative of a first amount of fuel supplied to the engine and determine the first amount of fuel supplied to the engine based at least in part on the first mass flow command. The ECM is still further configured to determine a second fuel level in the fuel tank based at least in part on the first amount of fuel supplied to the engine and cause the second fuel level to be displayed on the fuel level gauge.

In another aspect of the present disclosure, a method of determining a level of fuel in a fuel tank of a machine, includes identifying, by an engine control module (ECM), a first fuel level in the fuel tank and receiving, by the ECM, a first operator signal associated with operation of an engine. The method further includes generating, by the ECM and based at least in part on the first operator signal, a first mass flow command indicative of a first amount of fuel supplied to the engine and determining, by the ECM and based at least in part on the first mass flow command, the first amount of fuel supplied to the engine. The method still further includes determining, by the ECM and based at least in part on the first amount of fuel supplied to the engine, a second fuel level in the fuel tank and causing, by the ECM, the second fuel level to be displayed on a fuel level gauge.

In yet another aspect of the present disclosure, a fuel level system of a machine, includes a fuel level gauge, a fuel tank configured to hold fuel, and an engine control module (ECM) configured to determine a change in pressure of the fuel between a first time and a second time and determine a predicted change in pressure of the fuel between the first time and the second time based at least in part on a pressure model. The ECM is further configured to determine that the change in pressure and the predicted change in pressure are greater than a threshold level from each other and determine, based at least in part on the change in pressure and the predicted change in pressure being greater than the threshold level, that a fill event occurred between the first time and the second time. The ECM is still further configured to set, based on determining the fill event occurred between the first time and the second time, the first fuel level to full and cause the first fuel level to be displayed on the fuel level gauge.

DETAILED DESCRIPTION

Wherever possible, the same reference numbers will be used throughout the drawings to refer to the same or like parts.

Figure 1:
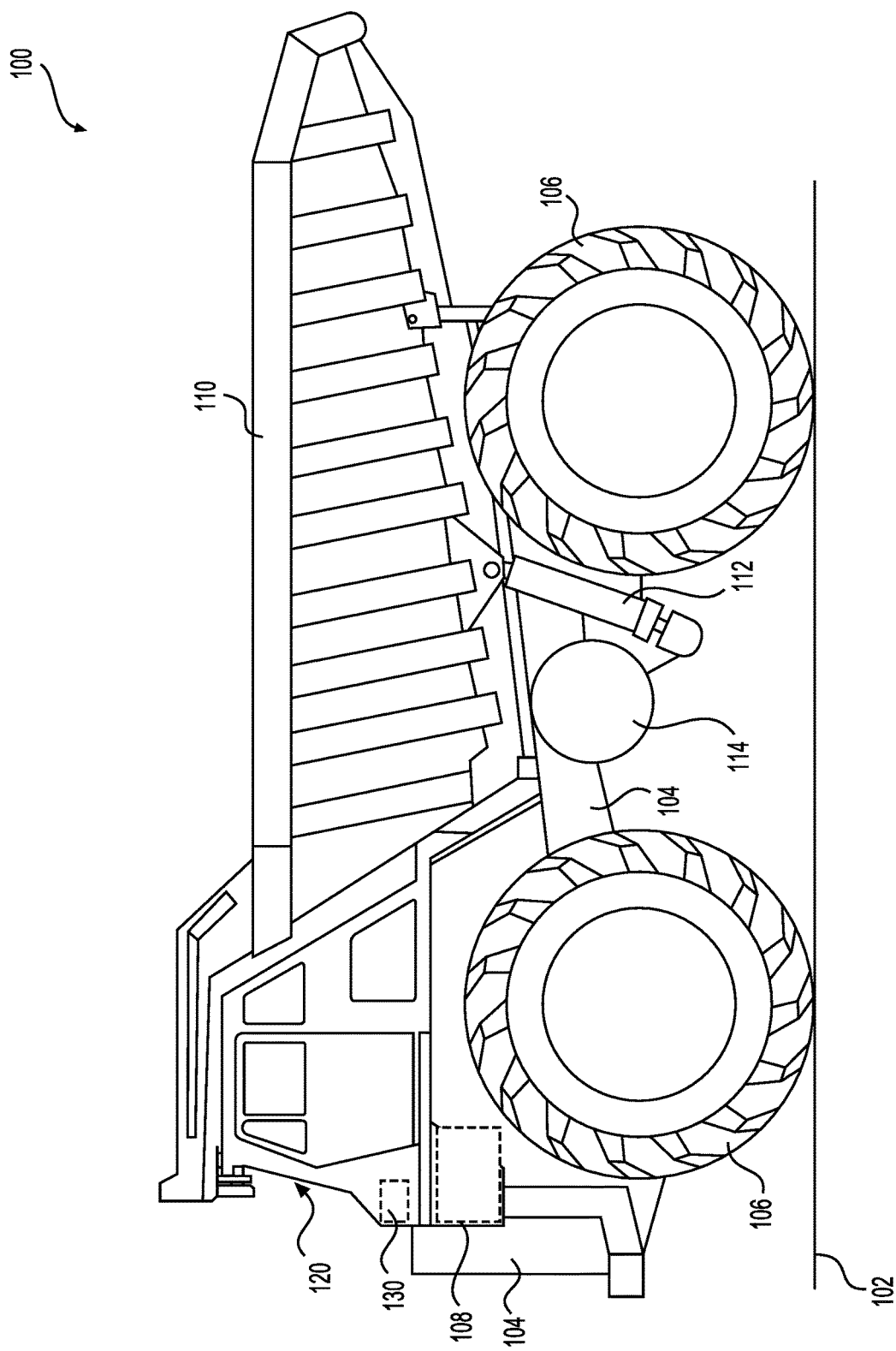
FIG. 1 is a schematic illustration of an example LNG powered machine with an LNG fuel tank, in accordance with examples of the disclosure.

FIG. 1 is a schematic illustration of an example LNG powered machine 100 with an LNG fuel tank 114, in accordance with examples of the disclosure. The LNG powered machine 100, although depicted as a mining truck type of machine, may be any suitable machine, such as any type of loader, dozer, dump truck, skid loader, excavator, compaction machine, backhoe, combine, crane, drilling equipment, tank, trencher, tractor, any suitable stationary machine, any variety of generator, locomotive, marine engines, combinations thereof, or the like. The LNG powered machine 100 is configured for propulsion using LNG, any other cryogenic fuel, hydrogen, various hydrocarbons (methane, ethane, propane, butane, pentane, hexane, combinations thereof, or the like), compressed natural gas (CNG), natural gas, LNG mixed with diesel, LNG mixed with gasoline, LNG mixed with kerosene, liquified petroleum gas (LPG), combinations thereof, or the like, as disclosed herein.

The LNG powered machine 100 is illustrated as a mining truck, which is used, for example, for moving mined materials, heavy construction materials, and/or equipment, and/or for road construction, building construction, other mining, paving and/or construction applications. For example, such an LNG powered machine 100 is used in situations where materials, such as mineral ores, loose stone, gravel, soil, sand, concrete, and/or other materials of a worksite need to be transported over a surface 102 at the worksite. The LNG powered machine 100 may be configured to carry material in a dump box 110 to another portion of the surface 102.

As discussed herein, the LNG powered machine 100 may also be in the form of a dozer, where the LNG powered machine 100 is used to redistribute and/or move material on the surface 102. For example, a dozer is configured to distribute soil or gravel over the surface 102. Further still, the LNG powered machine 100 may be in the form of a compaction machine that can traverse the surface 102 and impart vibrational forces to compact the surface 102. Such a compaction machine includes drums, which may vibrate to impart energy to the surface 102 for compaction. For example, a compaction machine is configured to compact freshly deposited asphalt and/or other materials disposed on and/or associated with the surface 102, such as to build a road or parking lot. It should be understood that the LNG powered machine 100 can be in the form of any other type of suitable construction, mining, farming, military, and/or transportation machine. In the interest of brevity, without individually discussing every type of construction and/or mining machine, it should be understood that the LNG drive mechanisms and/or mixed fuel mechanisms, as described herein, are configured for use in a wide variety of LNG powered machines 100.

As shown in FIG. 1, the example LNG powered machine 100 includes a frame 104 and wheels 106. The wheels 106 are mechanically coupled to a drive train (not shown) to propel the LNG powered machine 100. The LNG powered machine 100 includes an engine 108 that is of any suitable type, size, power output, etc. When the engine 108 is powered, the engine 108 causes the wheels 106 to rotate, via a drive train, to enable the LNG powered machine 100 to traverse the surface 102. Although illustrated in FIG. 1 as having a hub with a rubber tire, in other examples, the wheels 106 may instead be in the form of drums, chain drives, combinations thereof, or the like.

The frame 104 of the LNG powered machine 100 is constructed from any suitable materials, such as iron, steel, aluminum, other metals, ceramics, plastics, the combination thereof, or the like. The frame 104 is of a unibody construction in some cases, and in other cases, is constructed by joining two or more separate body pieces. Parts of the frame 104 are joined by any suitable variety of mechanisms, including, for example, welding, bolts, screws, other fasteners, epoxy, combinations thereof, or the like.

The engine 108, as described herein, is of any suitable type, such as an internal combustion engine that uses primarily LNG as fuel. In some cases, the engine 108 uses mixed fuels, such as, for example, 90% LNG and 10% diesel. The aforementioned mixture is an example, and it should be understood that the fuel mixture may be of any suitable ratio (e.g., 85% LNG-15% diesel, 95% LNG-5% diesel, etc.). In other cases, the engine 108 operates using other fuel mixtures, such as LNG-gasoline mixtures, LNG-kerosene mixtures, etc. In yet other cases, the engine 108 operates using other fuels, such as compressed natural gas (CNG), liquefied petroleum gas (LPG), other gaseous fuels, other liquid fuels, other cryogenic fuels, etc. LNG, CNG, LPG, or other potential fuels that power the engine 108 may include a variety of gaseous and/or liquid hydrocarbons including, but not limited to, methane, ethane, propane, butane, pentane, hexane, heptane, octane, ethene, propene, isobutene, butadiene, pentene, any suitable alkane, any suitable alkene, any suitable alkyne, any suitable cycloalkane, combinations thereof, or the like. It should also be noted that LNG, CNG, LPG, or other potential fuels that power the engine 108 typically include impurities, such as nitrogen, oxygen, argon, air, or the like. The engine 108 is mechanically coupled to a variety of drive train components, such as a drive shaft and/or axles, to rotate the wheels 106 and propel the LNG powered machine 100. The drivetrain includes any variety of other components including, but not limited to a differential, connector(s), constant velocity (CV) joints, etc.

The engine 108 is powered by providing the engine 108 with fuel, such as LNG or other suitable fuels and/or fuel blends discussed herein, from a fuel tank 114. The fuel tank 114 stores the fuel and/or fuel blend for operation of the engine 108 and provides that fuel to the engine 108 by the mechanisms described herein. In some examples, the fuel tank 114, particularly for cryogenic fuels (e.g., LNG) is double-layered for a relatively high level of thermal insulation. The configuration of the fuel tank 114, designed for relatively high thermal insulation, may make the fuel tank 114 difficult to access and/or repair in the field. For example, if a fill level sensor is implemented in the fuel tank 114, that sensor may be difficult, costly, and/or time consuming to repair. Furthermore, the fuel tank 114, in some cases, may not be reasonably repaired in the field, which may lead to extended downtime. It should also be noted that the inclusion of various sensors (e.g., fuel level sensors) may reduce the thermally insulative properties of the fuel tank 114, as the sensors themselves and/or electrical/mechanical connectors of the sensors may functionally be thermally conductive pathways. Thus, implementing the mechanisms and systems disclosed herein, lead to improved thermal insulation of cryogenic fuels, such as LNG.

The LNG powered machine 100 includes a dump box 110 or other moveable elements configured to move, lift, carry, and/or dump materials. The dump box 110 is used, for example, to pick up and carry dirt or mined ore from one location on the surface 102 to another location of the surface 102. The dump box 110 is actuated by one or more hydraulic system 112, or any other suitable mechanical system. In some cases, the hydraulic system 112 is powered by the engine 108, such as by powering hydraulic pump(s) (not shown) of the hydraulic system 112. It should be noted that in other types of machines (e.g., machines other than a mining truck) the hydraulic system 112 may be in a different configuration than the one shown herein, may be used to operate elements other than a dump box 110, and/or may be omitted.

With continued reference to FIG. 1, the LNG powered machine 100 also includes an operator station 120. The operator station 120 is configured to seat an operator (not shown) therein. The operator seated in the operator station 120 interacts with various control interfaces and/or actuators within the operator station 120 to control movement of various components of the LNG powered machine 100 and/or the overall movement of the LNG powered machine 100 itself. Thus, control interfaces and/or actuators within the operator station 120 allow the control of the propulsion of the LNG powered machine 100 by controlling the operation of the engine 108. An engine control module (ECM) 130 of the LNG powered machine 100 receives operator signal(s), such as an accelerator signal, based at least in part on the operator's interactions with one or more control interfaces and/or actuators of the LNG powered machine 100. The ECM 130 uses the operator signal(s) to generate command signals to control various components of the LNG powered machine 100.

The operator station 120 may also include one or more other control interface(s), such as levers and/or touch control panels that can be used to control one or more components of the LNG powered machine 100, such as the hydraulic system 112 to control the movement of the dump box 110 of the LNG powered machine 100. Other control interfaces and/or actuators within the operator station 120 allow the control of the hydraulic systems 112 of the LNG powered machine 100 by controlling the operation of the engine 108, according to some examples. Again, the ECM 130 receives operator signal(s) corresponding to the operator interacting with the hydraulic system 112 controls and uses those operator signals to generate various command signals to control various components of the LNG powered machine 100, as described further herein, in conjunction with FIG. 2. If an operator wishes to control the movement of the dump box 110, he or she may move a lever, interact with a control panel, or interact with any other suitable operator interface to control the movement of the dump box 110. As the operator interacts with the operator interface, operator signals may be generated that indicate the desired movement of the dump box 110. These pneumatic operator signals are provided to the ECM 130 to initiate the desired movements. Other components of the LNG powered machine 100 are controlled in a similar manner. For example, the operator station 120 also includes a steering system (not shown), including a steering wheel, levers, and/or other controls (not shown) for steering and/or otherwise operating the LNG powered machine 100.

The LNG powered machine 100 further includes any number of other components within the operator station 120 and/or at one or more other locations on the frame 104. These components include, for example, one or more of a location sensor (e.g., global positioning system (GPS)), an air conditioning system, a heating system, communications systems (e.g., radio, Wi-Fi connections), collision avoidance systems, sensors, cameras, etc. These systems are powered by any suitable mechanism, such as by using a direct current (DC) power supply powered by the engine 108 along with a generator (not shown) and/or inverter (not shown), an alternating current (AC) power supply powered by the engine 108 and a generator, and/or by mechanical coupling to the engine 108.

The ECM 130 includes single or multiple microprocessors, field programmable gate arrays (FPGAs), digital signal processors (DSPs), and/or other components configured to control the LNG powered machine 100. Numerous commercially available microprocessors can be configured to perform the functions of the ECM 130. Various known circuits are operably connected to and/or otherwise associated with the ECM 130 and/or the other circuitry of the LNG powered machine 100. Such circuits and/or circuit components include power supply circuitry, inverter circuitry, signal-conditioning circuitry, actuator driver circuitry, etc. The present disclosure, in any manner, is not restricted to the type of ECM 130 or the positioning depicted of the ECM 130 and/or the engine 108 relative to the LNG powered machine 100. The ECM 130 is configured to identify when a filling event takes place for the LNG powered machine 100 and further determines current levels of fuel in the fuel tank 114.

Figure 2:
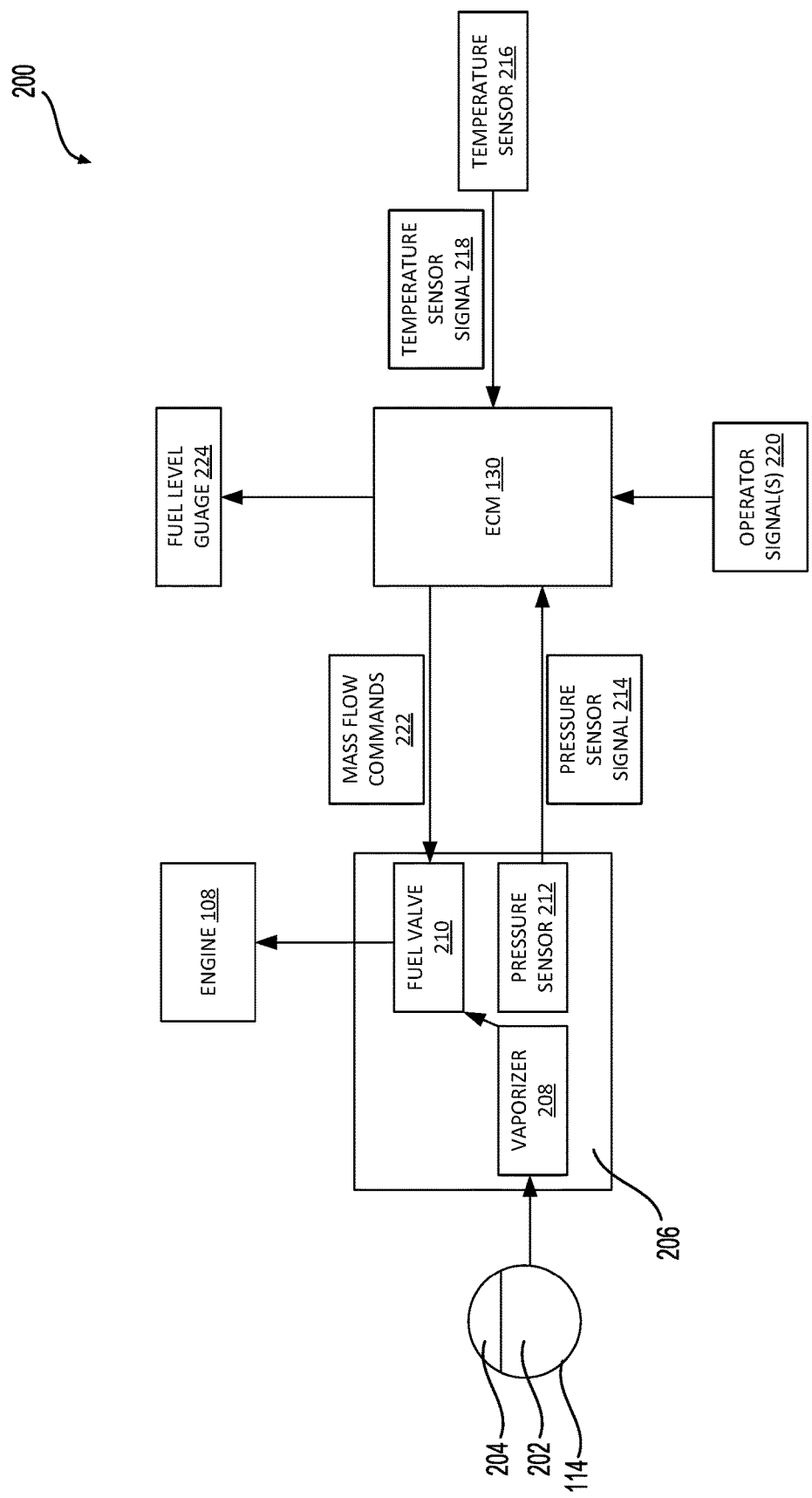
FIG. 2 is a schematic illustration of a fuel delivery system of the LNG powered machine depicted in FIG. 1 with a fuel level gauge, according to examples of the disclosure.

FIG. 2 is a schematic illustration of a fuel delivery system 200 of the LNG powered machine 100 depicted in FIG. 1 with a fuel level gauge 224, according to examples of the disclosure. As discussed herein, when an accelerator (not shown) is actuated (e.g., pressed with a foot) by an operator of the LNG powered machine 100 to indicate a desire to have the LNG powered machine 100 move, an associated operator signal 220 is generated. Thus, the accelerator is an actuator and/or is connected to one or more actuators that generates the operator signal that is sent to the ECM 130 of the LNG powered machine 100, as shown herein. The operator signal 220 generated indicates the magnitude of the desired movement of the LNG powered machine 100. When the operator signal 220, in the form of an acceleration signal, is received by the ECM 130, the ECM 130 controls various aspects of the fuel delivery system 200 to provided fuel from the fuel tank 114 to the engine 108.

The fuel tank 114 holding LNG, an LNG blend, and/or any other suitable fuel, as discussed herein, holds liquid fuel (e.g., LNG 202) and/or natural gas 204, also referred to as LNG vapor, head space vapor, boiled-off gas, and/or gas. Fuel, such as LNG 202 or natural gas 204 may be provided to a flow control apparatus 206 having a vaporizer 208, a fuel valve 210, and/or a pressure sensor 212. The vaporizer 208 allows the LNG 202 from the fuel tank 214 to be in gaseous form (e.g., natural gas) to be provided to the engine 108. Thus, the vaporizer 208 brings the fuel to a temperature and/or pressure that is suitable for the fuel to be in gas phase. In some cases, the vaporizer 208 heats the LNG 202 received from the fuel tank 114. In other cases, the vaporizer 208 allows the LNG to expand (e.g., go through a phase change from liquid to gas) therein. In yet other cases, the vaporizer 208 allows for both heating and expansion therein. In any of the examples described herein, fuel exits the vaporizer 208 in a state that is appropriate and/or optimized for consumption by the engine 108. The pressure sensor 212 is configured to measure the pressure of the fuel being provided to the vaporizer 208, in some examples. In other examples, the pressure sensor 212 is configured to measure the pressure of the fuel downstream of the vaporizer and upstream of the fuel valve 210. In yet other examples, the pressure sensor 212, or a group of pressure sensors 212, is configured to measure the pressure both upstream and downstream of the vaporizer 208. The pressure sensor 212 is configured to send a pressure sensor signal 214 to the ECM 130. The ECM 130 is configured to determine the fuel line pressure based at least in part on the pressure sensor signal 214.

The pressure sensor signal 214 is used by the ECM 130 to determine whether a filling event has occurred during any two points in time, such as while the LNG powered machine 100 is in a key-off state. According to some examples, the ECM 130 records a pressure level, based at least in part on the pressure sensor signal 214, at a first time. For example, the ECM 130 may record a pressure level, based at least in part on the pressure sensor signal 214, at a key-off event of the LNG powered machine 100. The ECM 130 again records a pressure level, based at least in part on the pressure sensor signal 214, at a subsequent second time. For example, the ECM 130 again records a pressure level, based at least in part on the pressure sensor signal 214, at a subsequent key-on event of the LNG powered machine 100. The ECM 130 predicts, based at least in part on one or more pressure models, an expected change in pressure between the first time and the second time (e.g., between the key-off event and the key-on event). The expected change in pressure may be based on any variety of factors and/or parameters that are input to the one or more pressure models. If the change in pressure between the first time and the second time is significantly different from what is expected, based at least in part on the one or more pressure models, it may indicate that the fuel tank 114 was refilled between the first time and second time. As a result, if the difference between expected pressure difference and actual pressure difference exceed a threshold level, then the ECM 130 may determine that a fill event took place between the first time and the second time. In some cases, as discussed herein, the ECM 130 may determine that a fill event took place between a key-off event and a key-on event of the LNG powered machine 100 based at least in part on the pressure differential between the time of the key-off event and the time of the subsequent key-on event.

The one or more pressure models may use any suitable input(s), such as pressure, time between the key-off and key-on events, temperature at key-off event, temperature at key-on event, difference in temperature from key-off to key-on events, combinations thereof, or the like. In some examples, the pressure model(s) are developed by training any suitable type of model using pressure differential data when it is known that a fill event has not occurred. The ECM 130 is configured to identify temperature differentials between a first time and a subsequent second time based at least in part on a temperature sensor 216 providing temperature sensor signal(s) 218 to the ECM 130. For example, the ECM 130 is configured to identify temperature differentials between the key-off and key-on events based at least in part on a temperature sensor 216 providing temperature sensor signal(s) 218 to the ECM 130.

These pressure models are of any suitable type, such as any variety of look-up table, fitting function, machine learning, and/or artificial intelligence models, such as neural network models. Other example machine learning model(s) that are generated and used as the one or more pressure model(s) include linear regression models, decision tree models, random forest models, Bayesian network models, any variety of heuristics (e.g., genetic algorithms, swarm algorithms, etc.), combinations thereof, or the like. The logistic regression models may be relatively lightweight models that are relatively easy to understand and relatively computationally light to implement during deployment. In some examples, the pressure models are a combination of different machine learning models.

As used herein, the key-off event may refer to when an operator turns the key of the LNG powered machine 100 to turn off one or more components of the LNG powered machine 100. A key-off event may indicate when the LNG powered machine 100 is turned off and/or if the engine 108 is turned off while other components of the machine are still operational. The ECM 130 receives an indication of the key-off event and can identify that the LNG powered machine 100 is in a key-off state. In examples, the ECM 130 is configured to identify that the engine 108 has been turned off, such as by an operator turning an ignition key to the off position, pressing an on/off switch, and/or by any other mechanism to turn off the engine 108 of the LNG powered machine 100. Other components of the LNG powered machine 100, such as electrical systems, heating/cooling systems, etc., may still be operational after the key-off event. Similar to the key-off event, a key-on event may refer to one or more components of the LNG powered machine 100 being turned on. Again, the ECM 130 receives an indication of the key-on event and can identify that the LNG powered machine 100 is in a key-on state. In examples, the ECM 130 is configured to identify that the engine 108 has been turned on, such as by an operator turning an ignition key to the on position, pressing an on/off switch, and/or by any other mechanism to turn on the engine 108 of the LNG powered machine 100. In some cases, a key-off state may be associated with and/or determined by identifying that the LNG powered machine 100 is not moving.

The pressure model(s) are used to determine, as one non-limiting example, that the expected pressure in the fuel lines, based at least in part on time and temperature differences from a first time to a subsequent second time, is predicted to increase from 500 kilo-Pascals (kPa) at the first time to 615 kPa at the second time. If the actual pressure at on the second time, based at least in part on the pressure sensor data 214, is measured to be 640 kPa, and the threshold level is 80 kPa, then the difference in the predicted versus actual pressure difference (e.g., (640 kPa–500 kPa)–(615 kPa–500 kPa)=25 kPa) is found to be less than the threshold level, and therefore, the ECM 130 may determine that no fill event had occurred between the first time and the second time. As another non-limiting example, consider that the key-off pressure was recorded as 705 kPa as the pressure at the first time, the key-on pressure was measured as 885 kPa as the pressure at the second time, the threshold level was 100 kPa, and the pressure model predicted pressure change is expected to be 55 kPa, or a key-on pressure of 760 kPa. In this case, the ECM 130 would determine that the measured pressure change of 180 kPa is greater than the threshold value of 100 kPa difference from the predicted pressure change of 55 kPa. As a result, the ECM 130 may determine that a fill event had occurred between the key-off and key-on events of the LNG powered machine 100. The values used in the preceding discussion are examples, and the first time pressure and/or key-off pressure, the second time pressure and/or key-on pressure, threshold level, and predicted pressure difference may be any suitable values.

If the ECM 130 determines that a fill event had occurred, then the ECM 130 may reset a current fuel level tracked by the ECM 130. For example, the ECM 130 may reset the fuel level to be a full tank after determining that a fill event had occurred. Alternatively, the ECM 130 may receive an indication, such as via a user input, indicating how much fuel has been filled in the fuel tank 114. In some cases, the ECM 130 may solicit the amount of fuel that has been filled such as via a user interface, such as a user interface located within the operator station 120 or on a remote controller device. In still other alternative cases, the ECM 130 may use the pressure differential between the first time (e.g., key-off event) and the second time (e.g., key-on event) to estimate the level of fuel in the fuel tank 114. When the ECM 130 determines a fuel level after a fill event, the ECM 130 may cause that fuel level to be displayed on the fuel level gauge 224. The fuel level gauge 224 may be of any suitable type, including, but not limited to, an analog gauge, a digital gauge, a gauge displayed on a display screen within the operator station 120 or a remote controller, combinations thereof, or the like.

The ECM 130 may further be configured to control the fuel valve 210 based at least in part on the received operator signal(s) 220. For example, the ECM 130 may receive operator signal(s) 220, such as an accelerator signal when an operator presses an accelerator or a hydraulic signal when an operator pulls on a lever to actuate the dump box 110. Thus, the ECM 130 may receive various operator signal(s) 220 indicative of operator inputs to various operator interfaces (e.g., accelerator, pneumatic/hydraulic levers, brakes, etc.). These operator signal(s) 220 may represent the operator's desired control and/or movement of the LNG powered machine 100 or components of the LNG powered machine 100. For example, the ECM 130 may receive an operator signal 220 indicating a magnitude of pressure an operator applies (e.g., how much the accelerator is depressed by the operator's foot) to the accelerator of the LNG powered machine 100.

In some alternative cases, the LNG powered machine 100 is controlled by a remote control interface (not shown) that is configured to receive user input(s) from a remote operator of the LNG powered machine 100. In this case, an operator may not be present in the operator station 120 of the LNG powered machine 100. In such examples, the remote control interface is any suitable device in communication with the ECM 130, such as a laptop computer, a desktop computer, a server, a netbook computer, a smartphone, a personal digital assistant (PDA), a tablet computing device, or the like. The remote control interface is located at a remote location from the LNG powered machine 100, at the worksite, or remote from the worksite. The remote control interface is configured to interact with the ECM 130 over a network, such as the Internet. The network is any suitable network, such as a local area network (LAN), a wide area network (WAN), or a collection of networks, such as the Internet. Protocols for network communication, such as WiFi, TCP/IP, and/or other suitable protocols and standards are used to implement the network. In some cases, the ECM 130 is configured to receive multiple inputs, such as various operator signals from the remote control interface, such as operator signals indicative of desired propulsion of the LNG powered machine 100, movement of the dump box 110, application of the brakes, turning on a cooling fan, and/or any other suitable control elements of the LNG powered machine 100.

Responsive to these operator signals 220, the ECM 130 may control the power output and/or the speed of the engine 108 by controlling the amount of fuel supplied to the engine 108 via the fuel valve 210. The ECM 130 is communicatively coupled, such as on a control plane, to control the fuel valve 210 and/or other components of the fuel delivery system 200 of the LNG powered machine 100. The ECM 130 may be configured to generate mass flow commands 222 and/or other controls to control various elements of the LNG powered machine 100, such as fuel valves 210. In other words, if an operator presses an accelerator relatively hard, that magnitude of desired engine 108 output is conveyed to the ECM 130 via an operator signal 220, which in turn is used by ECM 130 to generate a mass flow command 222 to cause the fuel valve 210 to allow a relatively high level of fuel (e.g., natural gas vapor from LNG) to be delivered to the engine 108. Thus, the ECM 130 generates mass flow commands 222 corresponding to the acceleration signal to control the engine 108 of the LNG powered machine 100 as described herein. Similarly, if the operator gently pressed the accelerator, then the ECM 130 may receive an operator signal indicating that relatively gentle acceleration and, in turn, provide operator signal(s) 220 to the ECM 130 to cause the LNG powered machine 100 to accelerate at a relatively low magnitude.

As discussed, the mass flow commands 222 correspond to a particular level of flow of fuel (e.g., natural gas vapor from LNG in the fuel tank 114). As a non-limiting example, a particular mass flow command 222 may open the fuel valve 210 to allow fuel flow at a rate of 4 kilograms (kg) per minute (min) for 15 seconds (s). In this case, the total fuel supplied to the engine 108 is equal to (4 kg/min)*(0.25 min) for 1 kg of fuel. In this way, the ECM 130 determines the amount of fuel supplied to the engine 108 based at least in part on the mass flow commands 222 also issued by the ECM 130. This fuel supplied is subtracted from a previous fuel level, by the ECM 130, to determine a current fuel level. Thus, according to some examples, the ECM 130 repeatedly determines the amount of fuel delivered to the engine 108 from the fuel tank 114 based at least in part on the mass flow commands 222 issued by the ECM 130 to the fuel valve 210, and then subtracts that amount of fuel from the immediately preceding determination of the fuel level, to determine a current fuel level. The current fuel level is then caused to be displayed on the fuel level gauge 224, such as within the operator station 120.

It should be understood that by the methods and systems discussed herein, the fuel level in the fuel tank 114 can be determined without the need for a flow meter in the path of fuel delivery to the engine 108. Thus, according to some examples, the fuel delivery system 200 does not include a flow meter to measure the amount of fuel delivered to the engine 108, but rather uses the mass flow commands 222 to determine and/or estimate the amount of fuel that is delivered to the engine 108 from the fuel tank 114. By not having a flow meter, additional elements in the fuel delivery path of the engine 108 can be avoided, leading to lower cost and/or reduced maintenance of the fuel delivery system 200 and/or the LNG powered machine 100. In alternative cases, there may be an additional flow meter in the fuel delivery system 200 to determine the amount of fuel delivered to the engine 108 independent and/or in addition to the fuel delivery determination form the mass flow commands 222, as discussed herein.

It should further be understood that the methods and systems, as discussed herein, may be used in addition to, in some example cases, or instead of, in other example cases, a fuel level sensor for measuring the fuel level of the fuel tank 114. A fuel level sensor for the fuel tank 114 may introduce a thermal pathway that may reduce the thermally insulative properties of the fuel tank 114 for the purposes of holding cryogenic fuels with a relatively high level of thermal insulation. In those cases, where a fuel level sensor is disposed on the fuel tank 114, the methods and systems, as disclosed herein, may cooperate with the fuel level sensor for periodic calibration between the different mechanisms of fuel level determination. Additionally, when a fuel tank-based fuel level sensor becomes defective, repair and/or replacement of that fuel level sensor may be expensive and/or time consuming, and in many cases, cannot be performed in the field. The difficulty with replacing and/or repairing a fuel level sensor may arise from the need for a fuel level sensor to be highly integrated with the fuel tank 114 to maintain a relatively high degree of thermal insulation. Additionally, the fuel tank 114 for LNG may be double or even triple layered and access to the inner cavity of the fuel tank may be difficult. In example cases, where the fuel tank does include a fuel level sensor, if that fuel level sensor is rendered defective, the fuel level can still be determined using the systems and methods disclosed herein.

Figure 3:
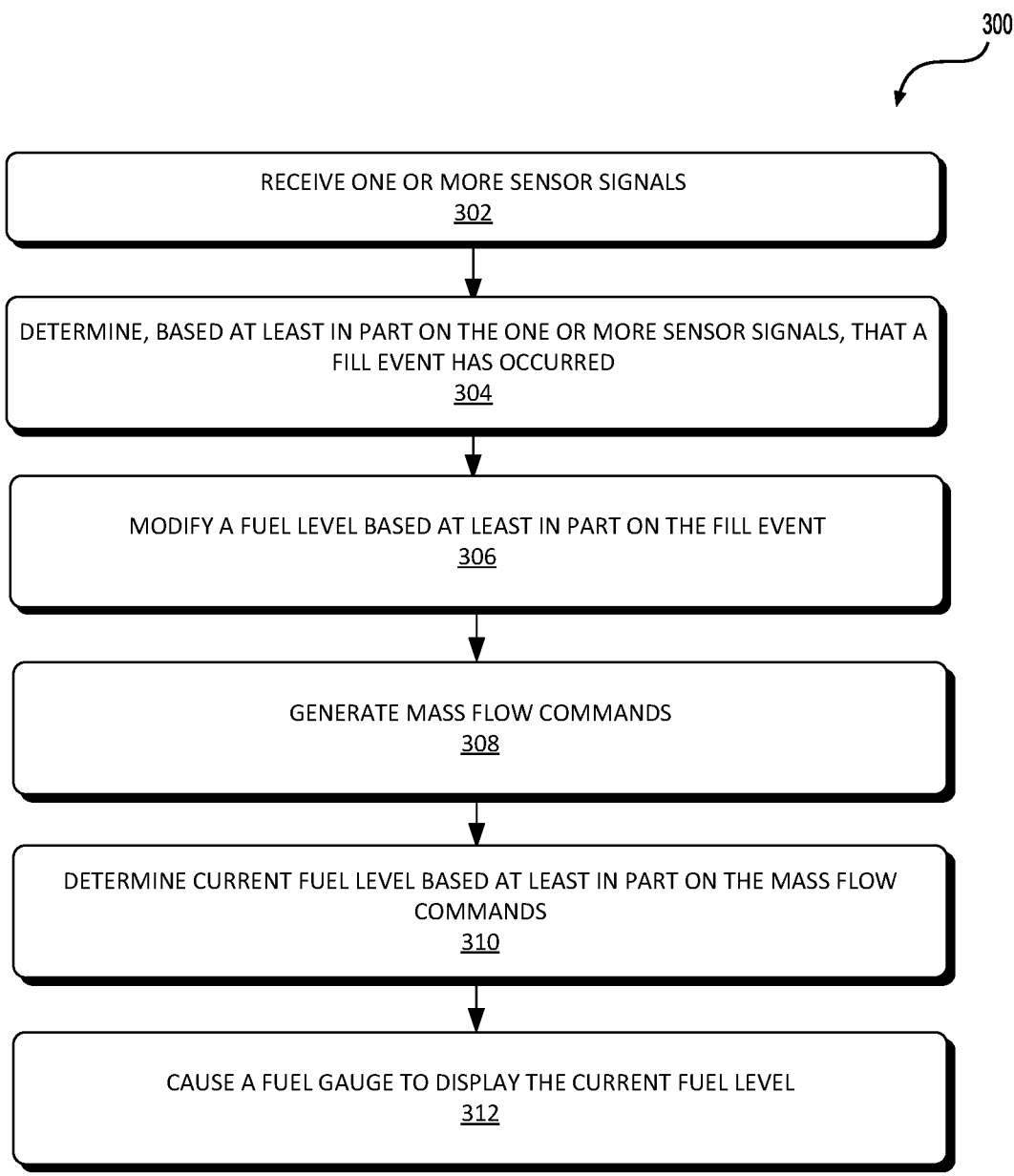
FIG. 3 is a flow diagram depicting an example method to display a current fuel level on the LNG powered machine of FIG. 1, according to examples of the disclosure.

FIG. 3 is a flow diagram depicting an example method 300 to display a current fuel level on the LNG powered machine of FIG. 1, according to examples of the disclosure. The processes of method 300 may be performed by the ECM 130, individually or in conjunction with one or more other components of LNG powered machine 100 and/or fuel delivery system 200. Method 300 allows an operator to view the current fuel level in the fuel tank 114 while the LNG powered machine 100 operates.

At block 302, the ECM may receive one or more sensor signals. These sensor signals include one or more of the pressure sensor signal 214, the temperature sensor signal 218, and/or any other suitable sensor signals. The ECM 130 may use the pressure sensor signal 214 and record the pressure in the fuel line at a first time, such as at a key-off event of the LNG powered machine 100. The ECM may further use pressure sensor signal 214 to determine and record the pressure in the fuel line at a second time, such as at a key-on event of the LNG powered machine 100. These sensor signals, such as the temperature sensor signal 218, may be used by the ECM 130, in conjunction with the pressure model(s) and elapsed time between the first time and the second time, such as time between a key-on and key-off event, to make predictions of expected pressure of fuel in the fuel lines at the key-on event.

At block 304, the ECM may determine, based at least in part on the one or more sensor signals, that a fill event has occurred. As discussed herein, the fill event may occur between any two times. In some cases, the fill event may occur after a key-off event and before a subsequent key-on event. The ECM 130 records a pressure level, based at least in part on the pressure sensor signal 214 at a first time, which in some cases may be at a time of a key-off event. The ECM 130 again records a pressure level, based at least in part on the pressure sensor signal 214, at a subsequent second time, which in some cases may be at the time of a key-on event. Additionally, the ECM 130 predicts, based at least in part on one or more pressure models, an expected change in pressure between the first time and the second time (e.g., between the key-off event and the key-on event). The expected change in pressure may be based on any variety of factors and/or parameters that are input to the one or more pressure models. For example, the temperature at the first time, the temperature at on the second time, the time elapsed between the first time and the second time, and/or any other suitable data may be inputs to the pressure model(s). If a pressure differential, as measured, between the first time to the second time is significantly different from what is expected, based at least in part on the one or more pressure model(s), the ECM 130 determines that the fuel tank 114 of the LNG powered machine 100 was refilled between the first time and the second time. As a result, if the difference between expected pressure difference and actual pressure difference exceed a threshold level, then the ECM 130 may determine that a fill event took place between the first time and the second time, which in some cases, may be between a key-off event and a key-on event of the LNG powered machine 100.

At block 306, the ECM may modify a fuel level based at least in part on the fill event. In some cases, the ECM 130 may reset the fuel level to be a full tank after determining that a fill event had occurred. Alternatively, the ECM 130 may receive an indication, such as via a user input, indicating how much fuel has been filled in the fuel tank 114, and may adjust its tracking of the current fuel level accordingly. In some cases, the ECM 130 may solicit the amount of fuel that has been filled such as via a user interface, such as a user interface located within the operator station 120 or on a remote controller device. In still other alternative cases, the ECM 130 may use the pressure differential between the first time (e.g., key-off event) and the second times (e.g., key-on event) to estimate the level of fuel in the fuel tank 114. In this latter case, the one or more pressure models may be used to determine the amount of fuel refilled in the fuel tanks 114 based at least in part on fitting the actual pressure differential to an expectation for a particular level of refilling of the fuel tank 114. When the ECM 130 determines a fuel level after a fill event, the ECM 130 may cause that fuel level to be displayed on the fuel level gauge 224.

At block 308, the ECM may generate mass flow commands. As discussed herein, the mass flow commands 222 correspond to a particular level of flow of fuel (e.g., natural gas vapor from LNG in the fuel tank 114). The mass flow commands 222 may be generated by the ECM 130 based at least in part on the received operator signal(s) 220. As a non-limiting example, a particular mass flow command 222 may open the fuel valve 210 to allow fuel flow at a rate of 2 kg/min for 20 seconds (s). In this case, the total fuel supplied to the engine 108 is equal to (2 kg/min)*(0.33 min) for 0.66 kg of fuel. Thus, the ECM 130 determines the amount of fuel supplied to the engine 108 based at least in part on the mass flow commands 222.

At block 310, the ECM determines a current fuel level based at least in part on the mass flow commands. The fuel supplied is subtracted from a previous fuel level, by the ECM 130, to determine a current fuel level. As this is performed repeatedly, the current fuel level is repeatedly updated during operation of the LNG powered machine 100. The current fuel level is then caused to be displayed on the fuel level gauge 224, such as within the operator station 120. In some cases, the fuel level may be displayed in units of weight and/or mass, such as kilograms of LNG, pounds of LNG, etc. In other cases, the fuel level may be displayed in volumetric units, such as gallons of LNG, liters of LNG, etc. The mass flow commands 222 can be any suitable units, such as in units of weight per unit time or units of volume per unit time. In determining the current fuel level, the density of the LNG may be used to translate between mass units and volumetric units of the LNG level and/or LNG flow.

At block 312, the ECM causes a fuel level gauge to display the current fuel level. The fuel level gauge 224 may be of any suitable type, including, but not limited to, an analog gauge, a digital gauge, a gauge displayed on a display screen within the operator station 120 or a remote controller, combinations thereof, or the like. Thus, an operator of the LNG powered machine 100 is able to see how much fuel is left in the fuel tank 114.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
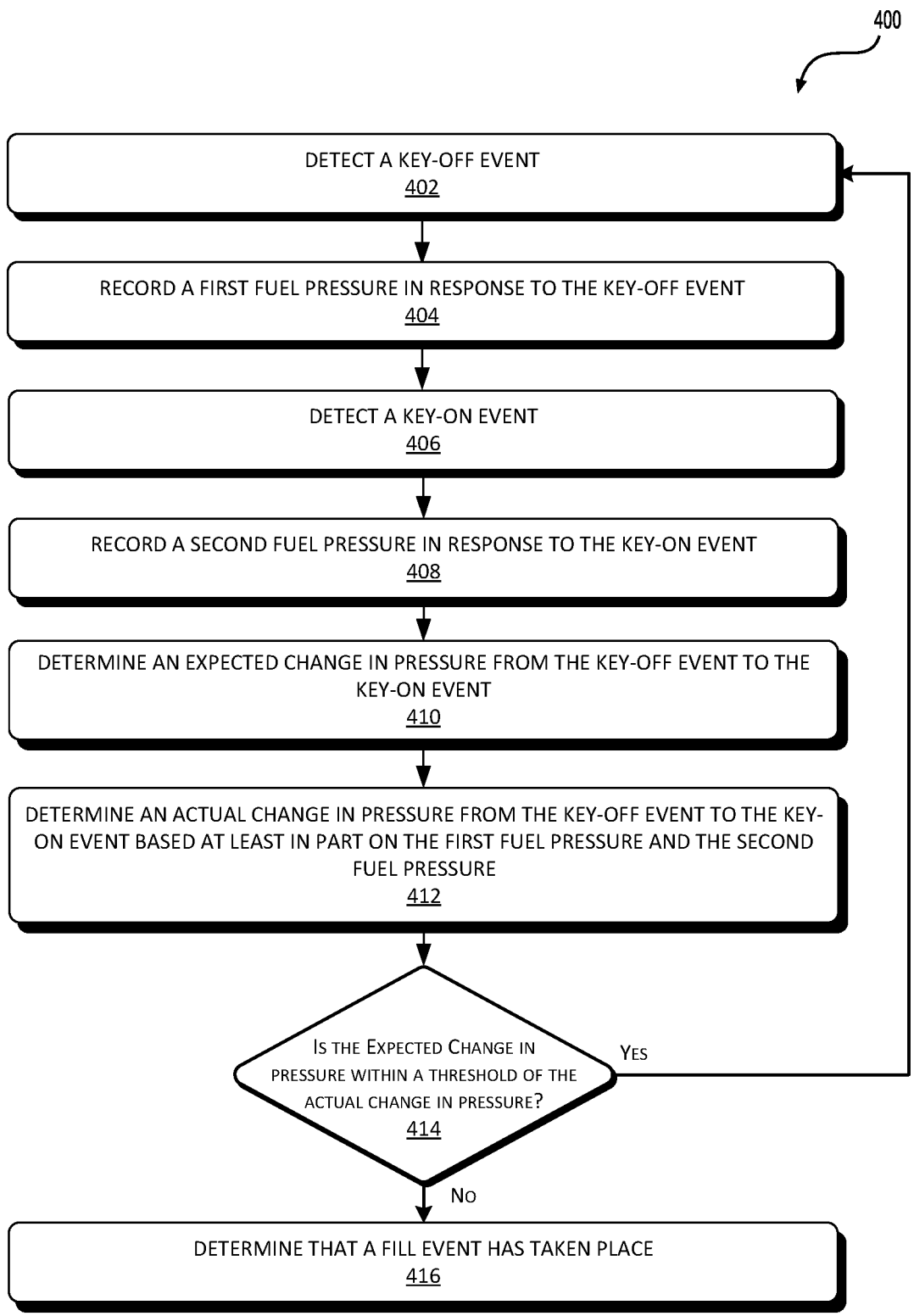
FIG. 4 is a flow diagram depicting an example method for determining that a fill event has occurred on the LNG powered machine of FIG. 1, according to examples of the disclosure.

FIG. 4 is a flow diagram depicting an example method 400 for determining that a fill event has occurred on the LNG powered machine 100 of FIG. 1, according to example cases of the disclosure. The processes of method 400 may be performed by the ECM 130, individually or in conjunction with one or more other components of LNG powered machine 100 and/or fuel delivery system 200. In some cases, the method 400 may be a specific implementation of the processes of blocks 302, 304, and 306 of method 300 of FIG. 3.

At block 402, the ECM may detect a key-off event. When the LNG powered machine 100 is turned off and/or if the engine 108 is turned off while other components of the machine are still operational, a key-off event may be detected by the ECM 130. In other words, the ECM 130 receives an indication that the engine 108 has been turned off, such as by an operator turning an ignition key to the off position, pressing an on/off switch, and/or by any other mechanism to turn off the LNG powered machine 100. Other components of the LNG powered machine 100, such as electrical systems, heating/cooling systems, etc., may still be operational after the key-off event. It should also be noted that instead of the key-off event, the method 400 may commence with any suitable first time from when an assessment is to be made as to whether a fill event has occurred.

At block 404, the ECM records a first fuel pressure in response to the key-off event. The ECM 130 may record the first fuel pressure as a last pressure level determined in the fuel line based at least in part on the pressure sensor signal 214. This measurement and/or recordation may occur at a relatively small amount of time after the key-off event is detected. The ECM 130 may store the first fuel pressure in memory associated with the ECM 130. Alternatively, as discussed herein, the ECM may record the first fuel pressure at a suitable first time from when an assessment is to be made as to whether a fill event has occurred.

At block 406, the ECM detects a key-on event. Similar to the key-off event, when the engine 108 is turned on, a key-on event may be detected by the ECM 130. In other words, the ECM 130 receives an indication that the engine 108 of the LNG powered machine 100 has been turned on, such as by an operator turning an ignition key to the on position, pressing an on/off switch, and/or by any other mechanism to turn on the engine 108 of LNG powered machine 100. Other components of the LNG powered machine 100, such as electrical systems, heating/cooling systems, etc., may still be operational before the key-on event. It should also be noted that instead of the key-on event, the method 400 may use any suitable second time at which an assessment is to be made as to whether a fill event has occurred.

At block 408, the ECM records a second fuel pressure in response to the key-on event. The ECM 130 may record the second fuel pressure as a first pressure level determined in the fuel line based at least in part on the pressure sensor signal 214. This measurement and/or recordation may occur at a relatively small amount of time after the key-on event is detected. The ECM 130 may store the second fuel pressure in memory associated with the ECM 130. Alternatively, as discussed herein, the ECM may record the second fuel pressure at a suitable second time, after the first time, when an assessment is to be made as to whether a fill event has occurred.

At block 410, the ECM determines an expected change in pressure from the key-off event to the key-on event (or from a first time to a second time, regardless of key state). As discussed herein, the expected change in pressure from the key-off event and the key-on event may be determined based at least in part on one or more pressure model(s) and any suitable inputs to the pressure model(s). The one or more pressure models may use any suitable input(s), such as pressure, time between the key-off and key-on events, temperature at key-off event, temperature at key-on event, difference in temperature from key-off to key-on events, combinations thereof, or the like. The pressure model(s) may be developed by training any suitable type of model using pressure differential data when it is known that a fill event has not occurred. The ECM 130 may identify temperature differentials between the key-off and key-on events based at least in part on a temperature sensor 216 providing temperature sensor signal(s) 218 to the ECM 130. The ECM 130 may also determine the time between the key-off event and the key-on event using any suitable mechanism, such as an internal clock, GPS signals that carry time information, mobile phone signals that carry time information, any variety of Internet based clocks, combinations thereof, or the like.

At block 412, the ECM determines an actual change in pressure from the key-off event to the key-on event based at least in part on the first fuel pressure and the second fuel pressure. In example cases, the ECM 130 may subtract the pressure recorded at the key-off event from the pressure recorded at the key-on event to determine the change in pressure from the key-off event to the key-on event. In other cases, the ECM 130 may subtract the pressure recorded at the key-on event from the pressure recorded at the key-off event to determine the change in pressure from the key-off event to the key-on event. In this latter case, the threshold value and the expected change in pressure are to be consistent with the way in which the actual change in pressure from the key-off event to the key-on event is determined. Alternatively, as discussed herein, the actual change in pressure may be determined from the first time to the second time, regardless of key state.

At block 414, the ECM may determine if the expected change in pressure is within a threshold of the actual change in pressure. If the ECM 130 determines that the expected change in pressure and the actual change in pressure is within the threshold level, then the method 400 may return to block 402 to record pressure when the next key-off event occurs, or alternatively at another time. In this way, the ECM 130 makes a determination of whether a fill event has taken place during any suitable time period, such as between a key-off event and a key-on event. If, on the other hand, the ECM 130 determines that the actual change in pressure is different from the expected change in pressure by more than the threshold level, then the method may proceed to block 416, where it is determined that a fill event has occurred. When a fill event has occurred, the current fuel level may be reset to a new value that reflects that the fill event has occurred.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
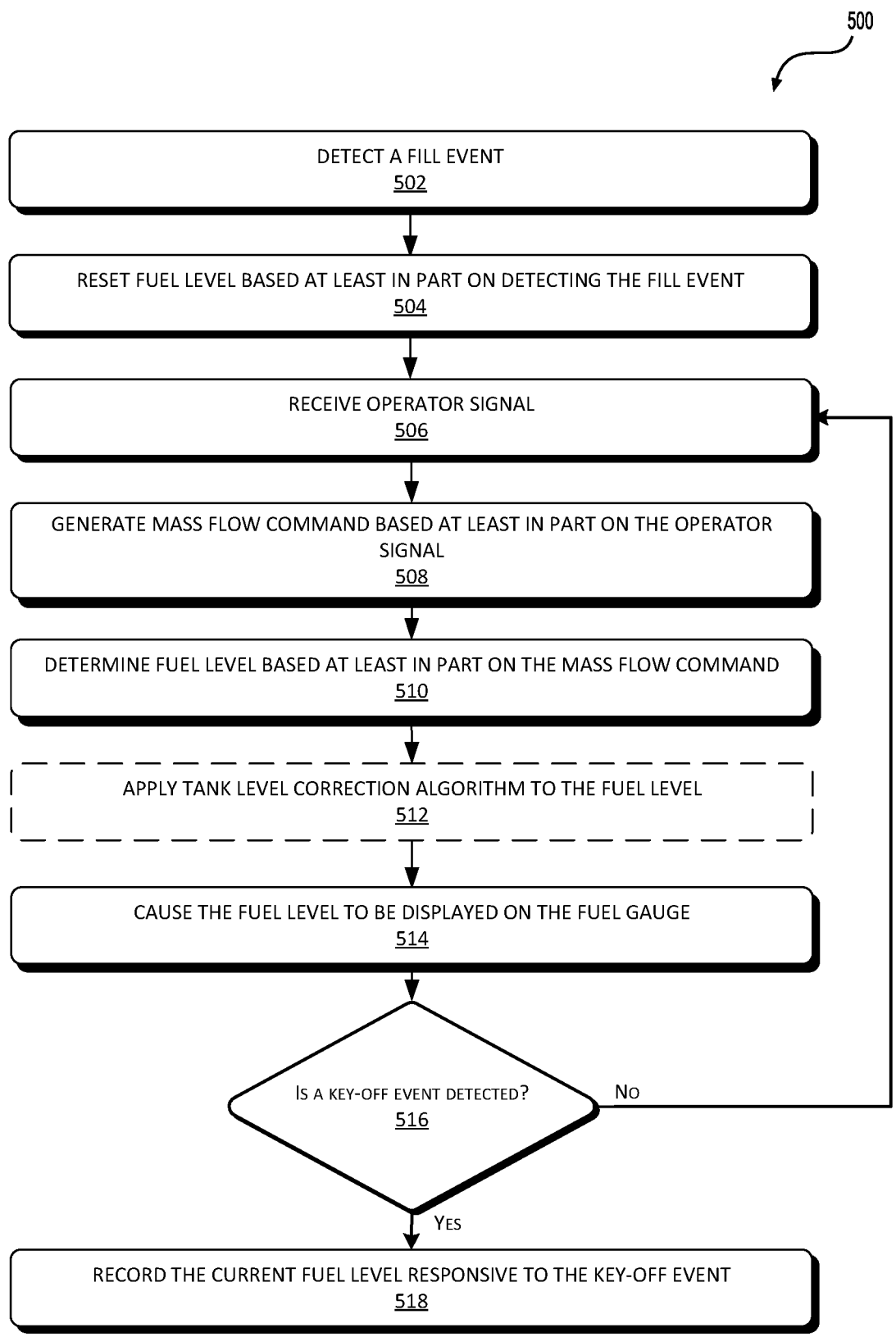
FIG. 5 is a flow diagram depicting an example method for displaying a fuel level during operation of the LNG powered machine of FIG. 1, according to examples of the disclosure.

FIG. 5 is a flow diagram depicting an example method 500 for displaying a fuel level during operation of the LNG powered machine 100 of FIG. 1, according to example cases of the disclosure. The processes of method 500 may be performed by the ECM 130, individually or in conjunction with one or more other components of LNG powered machine 100 and/or fuel delivery system 200. In some cases, the method 400 may be an implementation of the processes of blocks 308, 310, and 312 of method 300 of FIG. 3.

At block 502, the ECM detects a fill event. The fill event may be detected by the processes of method 300 and/or method 400, or by any other suitable mechanism. At block 504, the fuel level may be reset based at least in part on detecting the fill event. In some cases, the ECM 130 may reset the fuel level to be a full tank after determining that a fill event had occurred. Alternatively, the ECM 130 may receive an indication, such as via a user input, indicating how much fuel has been filled in the fuel tank 114, and may adjust its tracking of the current fuel level accordingly. In some cases, the ECM 130 may solicit the amount of fuel that has been filled such as via a user interface, such as a user interface located within the operator station 120 or on a remote controller device. In still other alternative cases, the ECM 130 may use the pressure differential between the key-off event and the key-on event to estimate the level of fuel in the fuel tank 114. In this latter case, the one or more pressure models may be used to determine the amount of fuel refilled in the fuel tanks 114 based at least in part on fitting the actual pressure differential to an expectation for a particular level of refilling of the fuel tank 114. When the ECM 130 determines a fuel level after a fill event, the ECM 130 may cause that fuel level to be displayed on the fuel level gauge 224.

At block 506, the ECM receives an operator signal. The operator signal 220, as received by the ECM 130, may indicate a desired power output, revolution rate (e.g., revolutions per minute (RPM)), the length of time at a particular power output, etc. of the engine 108 of the LNG powered machine 100. For example, when the operator signal 220, in the form of an acceleration signal, is received by the ECM 130, the ECM 130 controls various aspects of the fuel delivery system 200 to provided fuel from the fuel tank 114 to the engine 108 to provide a desired power output of the engine 108.

At block 508, the ECM generates a mass flow command based at least in part on the operator signal. As discussed herein, the mass flow commands 222 correspond to a particular level of flow of fuel (e.g., natural gas vapor from LNG in the fuel tank 114). The mass flow commands 222 may be generated by the ECM 130 to cause the engine 108 to operate in a manner corresponding to the received operator signal(s) 220. As a non-limiting example, a particular mass flow command 222 may open the fuel valve 210 to allow fuel flow at a rate of 4.7 kg/min for 30 seconds(s). In this case, the total fuel supplied to the engine 108 is equal to (4.7 kg/min)*(0.5 min) for 2.35 kg of fuel. Thus, the ECM 130 determines the amount of fuel supplied to the engine 108 based at least in part on the mass flow commands 222.

At block 510, the ECM determines the fuel level based at least in part on the mass flow command. As discussed herein, the amount of fuel supplied to the engine 108 is determined based at least in part on the mass flow command 222. As the fuel is supplied to the engine 108, the quantity of that supplied fuel is subtracted from a previous fuel level, by the ECM 130, to determine a current fuel level. The previous fuel level may be the prior current fuel level, determined based at least in part on a prior mass flow command 222, in some cases. In other cases, the previous fuel level may be a current fuel level stored by the ECM 130 prior to a key off event, where no filling event occurred between the key-off event and the subsequent key-on event. In yet other cases, the previous fuel level may be a fuel level determined at a key-on event, when the fuel tank 114 was filled while the engine 108 was turned off. The fuel level in the fuel tank 114 may be determined as total amount of LNG in the fuel tank, as quantity of LNG as a percentage of the total capacity of the fuel tank 114, as a percentage of the total amount of natural gas that can be supplied from the fuel tank 114, or by any other suitable metric.

At block 512, optionally, the ECM may apply a tank level correction algorithm to the fuel level. In some cases, the ECM 130 may periodically and/or continuously monitor the pressure sensor signals 214 generated by the pressure sensor 212 while the LNG powered machine 100 is operating. Artifacts in the pressure lines, such as a steep drop-off in the pressure with time, may be used to recalibrate and/or correct determined current fuel levels. For example, the ECM 130 may detect a relatively steep pressure drop in the fuel line based at least in part on the pressure sensor signal 214, and based thereon, may determine that the fuel level has dropped to a relatively low level (e.g., 10% of fuel tank capacity). In example cases, when such as steep drop in the pressure in the fuel line is detected by the ECM 130, the ECM 130 may adjust the current fuel level, if the current fuel level is not consistent with fuel levels where such a relatively steep drop in pressure is detected.

At block 514, the ECM may cause the fuel level to be displayed on the fuel level gauge. In some cases, the current fuel level data may be noisy. In these cases, any suitable smoothing function may be used to smooth out the fuel level data, such as a moving average, a windowed median, or the like. Causing the fuel level to be displayed on the fuel level gauge 224 may entail any suitable mechanism, such as the ECM 130 sending a message and/or indication of the current fuel level to a controller of a digital fuel level gauge that is configured to display the current fuel level. In other cases, the ECM 130 may generate an analog signal (e.g., 0 to 5 volts, where 0 volts indicates an empty tank and 5 volts indicates a full tank) to cause an analog fuel level gauge to display the current fuel level. The voltage range in the aforementioned example is for illustrative purposes, and it should be understood that the voltage range may be any suitable range.

At block 516, the ECM may determine whether a key-off event is detected. If a key-off event is not detected, then the method 500 may return to block 506, where additional operator signals 220 may be detected that are to control mass flow commands 222 generated by the ECM 130. Thus, according to example cases, the ECM 130 repeatedly determines the amount of fuel delivered to the engine 108 from the fuel tank 114 based at least in part on the mass flow commands issued by the ECM 130 to the fuel valve 210, and then subtracts that amount of fuel from the immediately preceding determination of the fuel level, to determine a current fuel level.

At block 516, if it is determined that a key-off event is indeed detected, then at block 518, the ECM records the current fuel level responsive to the key-off event. The current fuel level may be stored by the ECM 130 in memory associated with the ECM 130, so that the current fuel level is available to the ECM 130 when the LNG powered machine 100 is turned back on (e.g., after a key-on event). The current fuel level just prior to the engine 108 being turned off may be subsequently used as the starting fuel level when the engine 108 is turned back on, if a fill event was not detected while the engine 108 was turned off.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
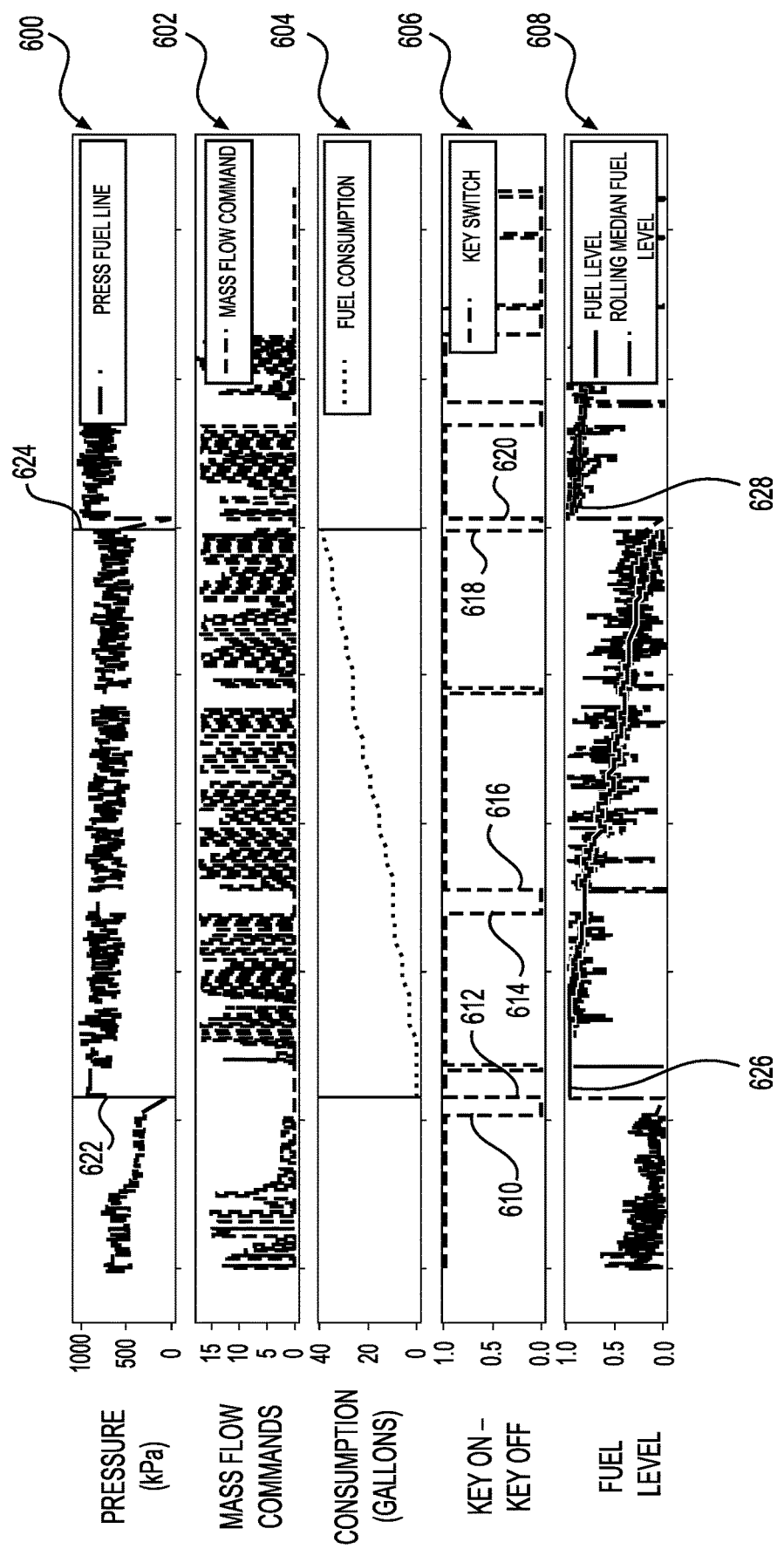
FIG. 6 are charts that depict a mechanism of determining a fuel level of the LNG powered machine of FIG. 1, according to examples of the disclosure.

FIG. 6 are charts 600, 602, 604, 606, 608 that depict a mechanism of determining a fuel level of the LNG powered machine 100 of FIG. 1, according to examples of the disclosure. Each of the charts 600, 602, 604, 606, 608 are over the same time span of the same LNG powered machine 100. Chart 600 depicts pressure in the fuel line, as may be determined by the ECM 130 based at least in part on pressure sensor signals 214 received by the ECM 130 during operation of the LNG powered machine, including before, during, and/or after key-off events 610, 614, 618 and key-on events 612, 616, 620. Chart 602 depicts the mass flow commands that are generated by the ECM 130 and used to control the supply of fuel to the engine 108, such as by controlling the fuel valve 210. Chart 604 depicts a cumulative level of gas consumption between two detected fill events 622, 624. Chart 606 depicts a key switch signal that indicates whether the engine 108 is turned on or turned off. Chart 608 depicts an instantaneous fuel level and a rolling median of the instantaneous fuel level.

As shown, the key-on event 612 results in a pressure differential from the corresponding key-off event 610, as shown in the chart 600, that indicates that a filling event had occurred while the engine 108 of the LNG powered machine 100 was turned off. Thus, at that point, the fuel level was reset to a "full" level, as shown near the point 626 of the rolling median fuel level of the chart 608. After the key-on event 612, as mass flow commands are issued by the ECM 130, the cumulative consumption increases. Accordingly, the fuel level decreases, as the mass flow commands are issued. With the fuel level chart 608, a rolling median over a window is used to reduce noise in the instantaneous fuel level data. As discussed herein, any suitable statistical function may be applied to the fuel level data to reduce noise in the data, such as a windowed average, windowed median, etc. It should be noted that in this particular case, although the fill event was detected at a time of the key-on event 612, the ECM 130 is configured to detect a fill event at any suitable time that does not correspond to a key-on event or a key-off event. In fact, the ECM 130 may detect a fill event between any two points in time.

Figure 7:
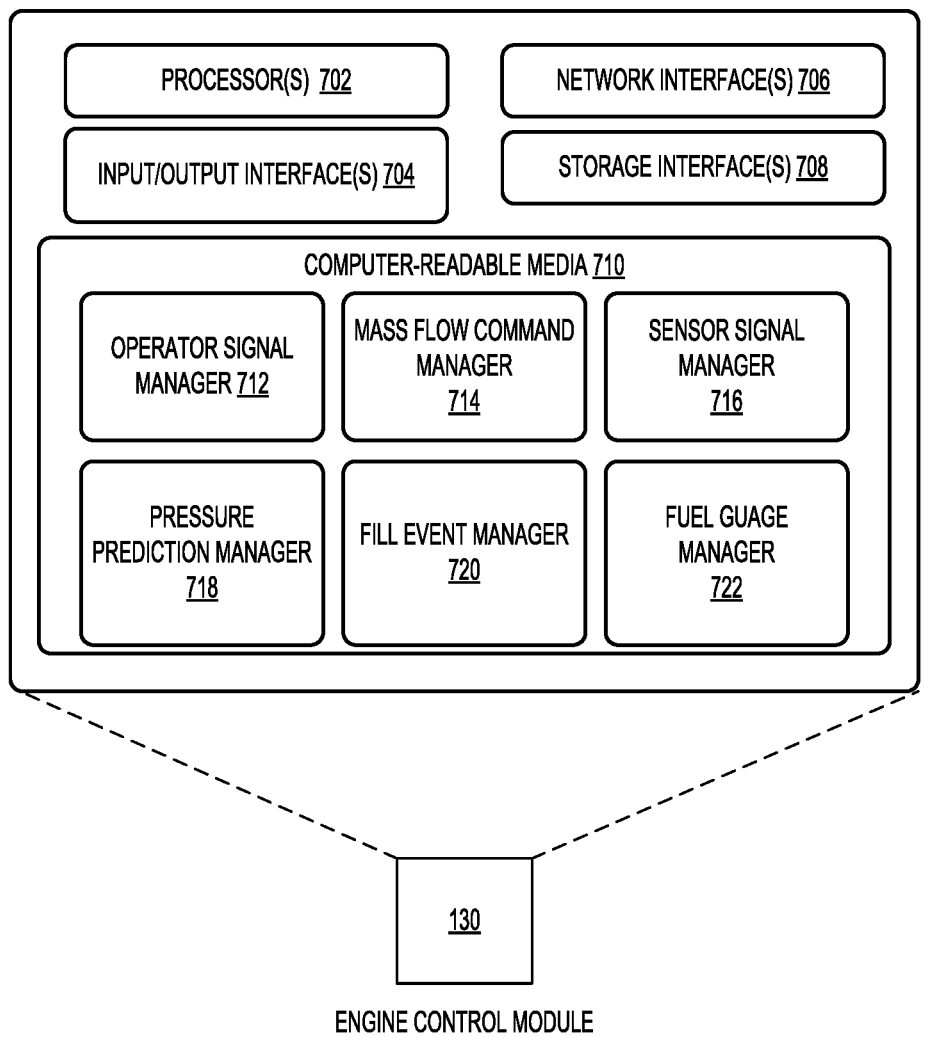
FIG. 7 is a block diagram of an example engine control module (ECM) that may determine the fuel level of the LNG powered machine of FIG. 1, according to examples of the disclosure.

FIG. 7 is a block diagram of an example engine control module (ECM) that may determine the fuel level of the LNG powered machine of FIG. 1, according to examples of the disclosure. The descriptions of other controllers that may be included in the LNG powered machine 100 may be similar to the descriptions of the ECM 130 herein. The ECM 130 includes one or more processor(s) 702, one or more input/output (I/O) interface(s) 704, one or more communication interface(s) 706, one or more storage interface(s) 708, and computer-readable media 710.

In some implementations, the processors(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program modules, program data, and/or one or more operating systems. The one or more processor(s) 702 may include one or more cores.

The one or more input/output (I/O) interface(s) 704 may enable the ECM 130 to detect interaction with an operator of the LNG powered machine 100. For example, the operator may press an accelerator, pull a lever, press a brake, or perform any other activity to indicate a desired action of the LNG powered machine 100. These activities on the part of the operator may be provided to the master controller as operator signals 220 that are received by the ECM 130. Thus, the I/O interface(s) 704 may include and/or enable the ECM 130 to receive indications of what actions the LNG powered machine 100 is to perform.

The network interface(s) 706 may enable the ECM 130 to communicate via the one or more network(s). The network interface(s) 706 may include a combination of hardware, software, and/or firmware and may include software drivers for enabling any variety of protocol-based communications, and any variety of wireline and/or wireless ports/antennas. For example, the network interface(s) 706 may comprise one or more of WiFi, cellular radio, a wireless (e.g., IEEE 802.1x-based) interface, a Bluetooth® interface, and the like. In some cases, if a remote control is used to control the LNG powered machine 100, one or more operator signals may be received by the ECM 130 from a remote controller of the LNG powered machine 100.

The storage interface(s) 708 may enable the processor(s) 702 to interface and exchange data with the computer-readable medium 710, as well as any storage device(s) external to the ECM 130. The storage interface(s) 708 may further enable access to removable media.

The computer-readable media 710 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 710 may be implemented as computer-readable storage media (CRSM), which may be any available physical media accessible by the processor(s) 702 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 702. The computer-readable media 810 may have an operating system (OS) and/or a variety of suitable applications stored thereon. The OS, when executed by the processor(s) 702 may enable management of hardware and/or software resources of the ECM 130.

Several components such as instruction, data stores, and so forth may be stored within the computer-readable media 710 and configured to execute on the processor(s) 702. The computer readable media 710 may have stored thereon an operator signal manager 712, a mass flow command manager 714, a sensor signal manager 716, a pressure prediction manager 718, a fill event manager 720, and a fuel gauge manager 722. It will be appreciated that each of the components 712, 714, 716, 718, 720, 722 may have instructions stored thereon that when executed by the processor(s) 702 may enable various functions pertaining to testing the LNG powered machine 100, as described herein.

The instructions stored in the operator signal manager 712, when executed by the processor(s) 702, may configure the ECM 130 to receive operator signals 220 from one or more actuators of the LNG powered machine 100. These actuators may provide operator signals 220 that correspond to qualities of how the engine 108 is to be run, such as the power output, RPMs, duration, etc. of running the engine 108.

The instructions stored in the mass flow command manager 714, when executed by the processor(s) 702, may configure the ECM 130 to generate and/or send mass flow commands 222 to control the delivery of fuel to the engine 108 responsive to the operator signals 220. The ECM 130 may deliver the mass flow commands 222 to the fuel valve 210 to control the flow of fuel (e.g., an LNG blend) to the engine 108.

The instructions stored in the sensor signal manager 716, when executed by the processor(s) 702, may configure the ECM 130 to receive various sensor signals, such as the pressure sensor signal 214 and/or the temperature sensor signal 218, and determine physical parameters therefrom. For example, the ECM 130 is configured to determine the pressure in the fuel line based at least in part on the pressure sensor signal 214. Similarly, the ECM 130 is configured to determine the temperature within the fuel line, the engine, and/or the ambient based at least in part on the temperature sensor signal 218. There may be any suitable number and/or types of sensors that may provide sensor signals to the ECM 130 and the ECM 130 is able to determine physical parameters based at least in part on those sensor signals.

The instructions stored in the pressure prediction manager 718, when executed by the processor(s) 702, may configure the ECM 130 to use one or more pressure model(s) to predict a pressure change between a key-off and key-on event. The prediction of the pressure change may be based at least in part on a variety of physical parameters, such as temperature, pressure, and/or time difference. These parameters are examples, and there may be any number or type of other parameters that are inputs to the one or more pressure model(s). The pressure model(s) may be stored in the memory 710 and accessed by the processor(s) 702 when needed for predicting the pressure change from a key-off event to a subsequent key-on event. In some cases, the processor(s) 702 may further be configured to train the one or more pressure model(s) based at least in part on training data gathered as key-off pressure measurements and key-on pressure measurements without an intervening filling event.

The instructions stored in the fill event manager 720, when executed by the processor(s) 702, may configure the ECM 130 to compare an actual pressure differential between two points in time, such as between a key-off event and a subsequent key-on event, to a corresponding predicted pressure differential. If the actual and predicted pressure differentials are within a threshold level, then the processor(s) 702 may determine that no filling event had occurred between the two points in time. On the other hand, if the actual and predicted pressure differentials are different by greater than a threshold level, then the processor(s) 702 may determine that a filling event had occurred between the two points in time.

The instructions stored in the fuel gauge manager 722, when executed by the processor(s) 702, may configure the ECM 130 to provide a current fuel level to the fuel level gauge 224 to have the current fuel level displayed to an operator of the LNG powered machine 100.

The disclosure is described above with reference to block and flow diagrams of systems, methods, apparatuses, and/or computer program products according to the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some examples of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other cases, the databases shown can be integrated or distributed into any number of databases or other data storage devices.

INDUSTRIAL APPLICABILITY

The present disclosure describes systems and methods for determining and indicating a fuel level for LNG powered machines 100, such as mining machines (e.g., a mining truck) that operates using LNG and/or LNG blends, rather than traditional diesel powered machines. These LNG powered machines 100 provide several advantages, such as reduced carbon, particulate, and/or VOC emissions. The systems and methods disclosed herein allow for determining the fuel level in the fuel tank of an LNG powered machine 100 using apparatus that is substantially non-intrusive to the fuel tank or the fuel supply lines to the engine 108.

By the fuel delivery system 200 disclosed herein, the viability of LNG powered machines for construction, mining, farming, and other activities is improved. The fuel delivery system 200 disclosed herein allows for relatively accurate and precise indications of LNG fuel levels in an LNG fuel tank 114 of an LNG powered machine 100. Thus, LNG powered machines 100 can be deployed at a work site and operators will be able to determine when the LNG powered machine's fuel tank 114 is to be refilled. Additionally, if the LNG powered machine 100 has other redundant fuel measurement sensor(s), if those other sensor(s) are rendered inoperable, then the systems and methods, as disclosed herein, can be used to determine the fuel level in the fuel tank. Since, other mechanisms (e.g., fuel level sensor(s)) are highly integrated with the highly insulated fuel tank, it is difficult to trouble shoot and/or repair broken fuel level sensor(s). Thus, by having additional mechanisms of determining the LNG level in the fuel tank 114, other than mechanisms that are highly integrated with the fuel tank 114 itself, the fuel level in the tank can be determined reliably even if sensor(s) or other components fail. Further still, integrating sensor(s) for measuring the fuel level of the fuel tank 114 results in thermal pathways that can diminish the thermally insulative properties of cryogenic fuel tanks, such as those used for LNG. Thus, the system(s) and mechanisms disclosed herein lend themselves to greater thermal efficiencies for holding cryogenic fuels, such as LNG. This leads to improved levels of worker and capital efficiency, greater uptime and field usage of construction equipment, and greater efficiency of construction, mining, agriculture, and/or transportation projects.

Although the systems and methods of LNG powered machines 100 are discussed in the context of a mining truck, it should be appreciated that the systems and methods discussed herein may be applied to a wide array of machines and vehicles across a wide variety of industries, such as construction, mining, farming, transportation, military, combinations thereof, or the like. For example, the fuel level measurement system disclosed herein may be applied to an excavator in the mining industry or a harvester in the farming industry.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A machine, comprising:
    an engine;
    a fuel level gauge;
    a pressure sensor;
    a fuel tank configured to hold fuel; and
    an engine control module (ECM), comprising one or more processors, configured to:
        determine, using the pressure sensor, a first pressure level in the fuel tank while the engine is turned off;
        determine, using the pressure sensor, a second pressure level in the fuel tank after the engine is turned on;
        determine, using a pressure model, a predicted change in pressure of the fuel, wherein the predicted change in pressure corresponds to a time period during which the engine is turned off;
        identify, based at least in part on the predicted change in pressure of the fuel, the first pressure level and the second pressure level, a first fuel level in the fuel tank;
        receive a first operator signal associated with operation of the engine;
        generate, based at least in part on the first operator signal, a first mass flow command indicative of a first amount of fuel supplied to the engine;
        determine the first amount of fuel supplied to the engine based at least in part on the first mass flow command;
        determine a second fuel level in the fuel tank based at least in part on the first amount of fuel supplied to the engine and the first fuel level; and
        cause the second fuel level to be displayed on the fuel level gauge.

2. The machine of claim 1, further comprising a fuel valve, wherein the first mass flow command controls the fuel valve to supply the first amount of fuel to the engine.

3. The machine of claim 1, wherein the ECM is further configured to:
    receive a second operator signal associated with the operation of the engine;
    generate, based at least in part on the second operator signal, a second mass flow command associated with a second amount of fuel supplied to the engine;
    determine the second amount of fuel supplied to the engine based at least in part on the second mass flow command;
    determine a third fuel level in the fuel tank based at least in part on the second amount of fuel supplied to the engine; and
    cause the third fuel level to be displayed on the fuel level gauge.

4. The machine of claim 1, wherein the ECM is further configured to:
    determine a change in pressure of the fuel while the engine is turned off;
    determine that the change in pressure and the predicted change in pressure are within a threshold level of each other; and
    determine, based at least in part on the change in pressure and the predicted change in pressure being within the threshold level of each other, that the first fuel level was a current fuel level prior to the engine being turned off.

5. The machine of claim 1, wherein the ECM is further configured to:
    determine a change in pressure of the fuel while the engine is turned off;
    determine that the change in pressure and the predicted change in pressure are greater than a threshold level from each other; and
    determine, based at least in part on the change in pressure and the predicted change in pressure being greater than the threshold level, that a fill event occurred while the engine was turned off.

6. The machine of claim 5, wherein the ECM is further configured to:

set, based on determining the fill event occurred while the engine was turned off, the first fuel level to full.

7. The machine of claim 5, wherein to determine the change in pressure while the engine is turned off, the ECM is further configured to:
identify that the engine has been turned off;
receive a first pressure signal from the pressure sensor;
determine the first pressure level based at least in part on the first pressure signal;
record the first pressure level based at least in part on identifying that the engine has been turned off;
identify that the engine has been turned on;
receive a second pressure signal from the pressure sensor;
determine the second pressure level based at least in part on the second pressure signal; and
determine the change in pressure while the engine is turned off based at least in part on the first pressure level and the second pressure level.

8. The machine of claim 1, further comprising:
a temperature sensor, wherein to determine the predicted change in pressure while the engine is turned off, the ECM is further configured to:
receive a temperature sensor signal from the temperature sensor;
determine a temperature associated with the fuel based at least in part on the temperature sensor signal; and
input the temperature associated with the fuel into the pressure model to determine the predicted change in pressure of the fuel while the engine is turned off.

9. The machine of claim 1, wherein the fuel is at least one of: (i) liquid natural gas (LNG); (ii) LNG blend; (iii) natural gas; (iv) compressed natural gas (CNG); or (v) liquid petroleum gas (LPG).

10. A method of determining a level of fuel in a fuel tank of a machine, comprising:
determining, by a pressure sensor, a first pressure level in the fuel tank while an engine is turned off;
determining, using the pressure sensor, a second pressure level in the fuel tank after the engine is turned on;
determining, using a pressure model, a predicted change in pressure of the fuel, wherein the predicted change in pressure corresponds to a time period during which the engine is turned off;
identifying, by an engine control module (ECM), comprising one or more processors, and based at least in part on the predicted change in pressure of the fuel, the first pressure level in the fuel tank and the second pressure level in the fuel tank, a first fuel level in the fuel tank;
receiving, by the ECM, a first operator signal associated with operation of the engine;
generating, by the ECM and based at least in part on the first operator signal, a first mass flow command indicative of a first amount of fuel supplied to the engine;
determining, by the ECM and based at least in part on the first mass flow command, the first amount of fuel supplied to the engine;
determining, by the ECM and based at least in part on the first amount of fuel supplied to the engine and the first fuel level, a second fuel level in the fuel tank; and
causing, by the ECM, the second fuel level to be displayed on a fuel level gauge.

11. The method of claim 10, further comprising:
receiving, by the ECM, a second operator signal associated with the operation of the engine;
generating, by the ECM and based at least in part on the second operator signal, a second mass flow command associated with a second amount of fuel supplied to the engine;
determining, by the ECM and based at least in part on the second mass flow command, the second amount of fuel supplied to the engine;
determining, by the ECM and based at least in part on the second amount of fuel supplied to the engine, a third fuel level in the fuel tank; and
causing, by the ECM, the third fuel level to be displayed on the fuel level gauge.

12. The method of claim 10, further comprising:
determining, by the ECM, a change in pressure of the fuel between a first time and a second time;
determining, by the ECM, that the change in pressure and the predicted change in pressure are within a threshold level of each other; and
determining, by the ECM and based at least in part on the change in pressure and the predicted change in pressure being within the threshold level of each other, that the first fuel level was a current fuel level at the first time.

13. The method of claim 10, further comprising:
determining, by the ECM, a change in pressure of the fuel between a first time and a second time;
determining, by the ECM, that the change in pressure and the predicted change in pressure are greater than a threshold level from each other;
determining, by the ECM and based at least in part on the change in pressure and the predicted change in pressure being greater than the threshold level, that a fill event occurred between the first time and the second time; and
setting, by the ECM and based on determining the fill event occurred between the first time and the second time, the first fuel level to full.

14. The method of claim 13, wherein determining the change in pressure of the fuel between the first time and the second time further comprises:
identifying, by the ECM, that the engine has been turned off;
receiving, by the ECM, a first pressure signal from the pressure sensor;
determining, by the ECM, the first pressure level based at least in part on the first pressure signal;
identifying, by the ECM, that the engine has been turned on;
receiving, by the ECM, a second pressure signal from the pressure sensor;
determining, by the ECM and based at least in part on the second pressure signal, the second pressure level; and
determining, by the ECM and based at least in part on the first pressure level and the second pressure level, the change in pressure between the first time and the second time.

15. The method of claim 13, wherein determining the predicted change in pressure of the fuel between the first time and the second time further comprises:
receiving, by the ECM, a temperature sensor signal from a temperature sensor;
determining, by the ECM and based at least in part on the temperature sensor signal, a temperature associated with the fuel; and
inputting, by the ECM, the temperature associated with the fuel into the pressure model to determine the predicted change in pressure of the fuel between the first time and the second time.

16. A fuel level system of a machine, comprising:
a fuel level gauge;
a fuel tank configured to hold fuel; and
an engine control module (ECM)), comprising one or more processors, configured to:
  determine a change in pressure of the fuel between a first time and a second time;
  determine a predicted change in pressure of the fuel between the first time and the second time based at least in part on a pressure model;
  determine that the change in pressure and the predicted change in pressure are greater than a threshold level from each other;
  determine, based at least in part on the change in pressure and the predicted change in pressure being greater than the threshold level, that a fill event occurred between the first time and the second time;
  set, based on determining the fill event occurred between the first time and the second time, a first fuel level to full; and
  cause the first fuel level to be displayed on the fuel level gauge.

17. The fuel level system of the machine of claim 16, further comprising:
a pressure sensor, wherein to determine the change in pressure between the first time and the second time, the ECM is further configured to:
  receive a first pressure signal from the pressure sensor at the first time;
  determine a first pressure level based at least in part on the first pressure signal;
  record the first pressure level;
  receive a second pressure signal from the pressure sensor at the second time;
  determine a second pressure level based at least in part on the second pressure signal; and
  determine the change in pressure between the first time and the second time based at least in part on the first pressure level and the second pressure level.

18. The fuel level system of the machine of claim 16, further comprising:
a temperature sensor, wherein to determine the predicted change in pressure between the first time and the second time, the ECM is further configured to:
  receive a temperature sensor signal from the temperature sensor;
  determine a temperature associated with the fuel based at least in part on the temperature sensor signal; and
  input the temperature associated with the fuel into the pressure model to determine the predicted change in pressure of the fuel between the first time and the second time.

19. The fuel level system of the machine of claim 16, further comprising:
an engine, wherein the ECM is further configured to:
  receive a first operator signal associated with operation of the engine;
  generate, based at least in part on the first operator signal, a first mass flow command associated with a first amount of fuel supplied to the engine;
  determine the first amount of fuel supplied to the engine based at least in part on the first mass flow command;
  determine a second fuel level in the fuel tank based at least in part on the first fuel level and the first amount of fuel supplied to the engine; and
  cause the second fuel level to be displayed on the fuel level gauge.

20. The fuel level system of the machine of claim 19, wherein the ECM is further configured to:
receive a second operator signal associated with the operation of the engine;
generate, based at least in part on the second operator signal, a second mass flow command associated with a second amount of fuel supplied to the engine;
determine the second amount of fuel supplied to the engine based at least in part on the second mass flow command;
determine a third fuel level in the fuel tank based at least in part on the second amount of fuel supplied to the engine; and
cause the third fuel level to be displayed on the fuel level gauge.

* * * * *